United States Patent
Chen et al.

(10) Patent No.: US 9,722,875 B2
(45) Date of Patent: Aug. 1, 2017

(54) MASTER DEVICE, SLAVE DEVICE, AND METHODS THEREOF

(71) Applicant: INDUSTRIAL TECHNOLOGY RESEARCH INSTITUTE, Hsinchu (TW)

(72) Inventors: Chi-Chun Chen, Hsinchu (TW); Shua-Yuan Lai, Miaoli County (TW); Zhong-Zhen Wu, Kaohsiung (TW)

(73) Assignee: INDUSTRIAL TECHNOLOGY RESEARCH INSTITUTE, Hsinshu (TW)

( * ) Notice: Subject to any disclaimer, the term of this patent is extended or adjusted under 35 U.S.C. 154(b) by 707 days.

(21) Appl. No.: 13/710,751

(22) Filed: Dec. 11, 2012

(65) Prior Publication Data

US 2013/0170336 A1 Jul. 4, 2013

(30) Foreign Application Priority Data

Dec. 30, 2011 (TW) .............................. 100149773 A

(51) Int. Cl.
*H04L 12/24* (2006.01)
*H04L 12/44* (2006.01)

(52) U.S. Cl.
CPC .............. *H04L 41/12* (2013.01); *H04L 12/44* (2013.01)

(58) Field of Classification Search
CPC .......... H04L 41/12; H04L 12/44; H04L 45/00
See application file for complete search history.

(56) References Cited

U.S. PATENT DOCUMENTS

| 7,583,592 | B2 | 9/2009 | Park et al. | |
| 7,787,772 | B2 | 8/2010 | Ota | |
| 7,848,224 | B2 | 12/2010 | Bryant et al. | |
| 7,983,207 | B2 | 7/2011 | Lai et al. | |
| 2004/0018839 | A1* | 1/2004 | Andric et al. | 455/433 |
| 2004/0105390 | A1 | 6/2004 | Saksio | |
| 2007/0258382 | A1* | 11/2007 | Foll | H04L 12/2602 370/252 |
| 2010/0260071 | A1* | 10/2010 | Lai et al. | 370/256 |

(Continued)

FOREIGN PATENT DOCUMENTS

TW 201038016 A 10/2010

OTHER PUBLICATIONS

Mehdi EffatParvarl et al., "Reliable Multicast Routing with Local Recovery Approach in Ad Hoc. Network", Access Networks & Workshops, 2007. AccessNets '07. Second International Conference on, Date of Conference: Aug. 22-24, 2007, 6 pages.

(Continued)

*Primary Examiner* — Christopher Grey
(74) *Attorney, Agent, or Firm* — Muncy, Geissler, Olds & Lowe, P.C.

(57) ABSTRACT

A master device, a slave device, and methods are disclosed. The method is performed by a first slave device connected to a master-slave tree network, comprising: determining whether a beacon has not been received within a predetermined time period; and distributing a first beacon to a second slave device if no beacon has been received within the predetermined time period; wherein for the first slave device to remain in the master-slave-network, a beacon be received by the first slave device within the predetermined time period.

14 Claims, 5 Drawing Sheets

(56) References Cited

U.S. PATENT DOCUMENTS

2011/0051644 A1     3/2011   Huang et al.
2013/0170499 A1*   7/2013   Ramanujan ........... H04W 40/26
                                                                                                                                                                   370/401

OTHER PUBLICATIONS

Charles E. Perkins et al., "Ad-hoc Demand Distance Vector Routing", Mobile Computing Systems and Applications, 1999. Proceedings. WMCSA '99. Second IEEE Workshop on, Date of Conference: Feb. 25-26, 1999, pp. 90-100.

Shih-Lin Wu et al., "Route Maintenance in aWireless Mobile Ad Hoc Network", Proceedings of the 33rd Hawaii International Conference on System Sciences—2000, pp. 1-10.

Jim M. Ng et al., "A Fast Energy-efficient Multicast Tree Recovery Algorithm for Ad hoc Network" *2003 The Institubion of Electrical Engineem.*, pp. 281-285.

Choon-Sung Nam et al., "Efficient Path Setup and Recovery in Wireless Sensor Networks by using the Routing Table", 2010 2nd International Conference on Education Technology and Computer (ICETC),pp. V4-156-v4-159.

Official Action issued on May 27, 2014, in corresponding Taiwanese Patent Application No. 100149773.

* cited by examiner

MASTER DEVICE, SLAVE DEVICE, AND METHODS THEREOF

CROSS REFERENCE TO RELATED APPLICATIONS

This application claims priority of Taiwan Patent Application No. 100149773, filed on Dec. 30, 2011, and the entirety of which is incorporated by reference herein.

TECHNICAL FIELD

The present disclosure relates to a network system and methods thereof.

BACKGROUND

With the advancement of power line network technology, applications thereof have increased in electricity meter and electricity apparatus monitoring, for example, monitoring electricity consumption in a household from a remote office. The Powerline Intelligent Metering Evolution (PRIME) standard adopts a master-slave network topology for the powerline network, where a root node and a plurality of leaf nodes constitute a tree structure, in which there are also switch nodes which serve as relay points between the root node and the leaf nodes. Transmission between the leaf nodes must be conducted through the master node, leading to heavy network traffic loading at the root node and traffic congestion across the master-salve tree network. When a branch node malfunctions, all nodes successive to the broken node may be seriously affected.

SUMMARY

The disclosure provides a method is disclosed, performed by a first slave device connected to a master-slave tree network, comprising: determining whether a beacon has not been received within a predetermined time period; and distributing a first beacon to a second slave device if no beacon has been received within the predetermined time period, wherein for the first slave device to remain in the master-slave tree network, a beacon be received by the first slave device within the predetermined time period.

The disclosure provides a master device is revealed, for use in a master-slave tree network, comprising a transceiver and a controller. The transceiver is configured to receive an identifier request message comprising a first identifier, wherein the first identifier identifies a first slave device, which is abnormally disconnected from the master-slave tree network. The controller is coupled to the transceiver, configured to assign a second identifier to the first slave device in response to the identifier request message. The transceiver is further configured to transmit an identifier confirm message comprising the second identifier to the first slave device.

The disclosure provides a slave device is provided, connected to a master-slave tree network, comprising a controller and a beacon circuit. The controller is configured to determine whether a beacon has not been received within a predetermined time period. The beacon circuit is coupled to the controller and configured to distribute a first beacon to a second slave device if no beacon has been received within the predetermined time period. For the first slave device to remain in the master-slave tree network, a beacon be received by the first slave device within the predetermined time period.

BRIEF DESCRIPTION OF DRAWINGS

The disclosure can be more fully understood by reading the subsequent detailed description and examples with references made to the accompanying drawings, wherein.

DETAILED DESCRIPTION

A detailed description is given in the following embodiments with reference to the accompanying drawings.

Figure 1:
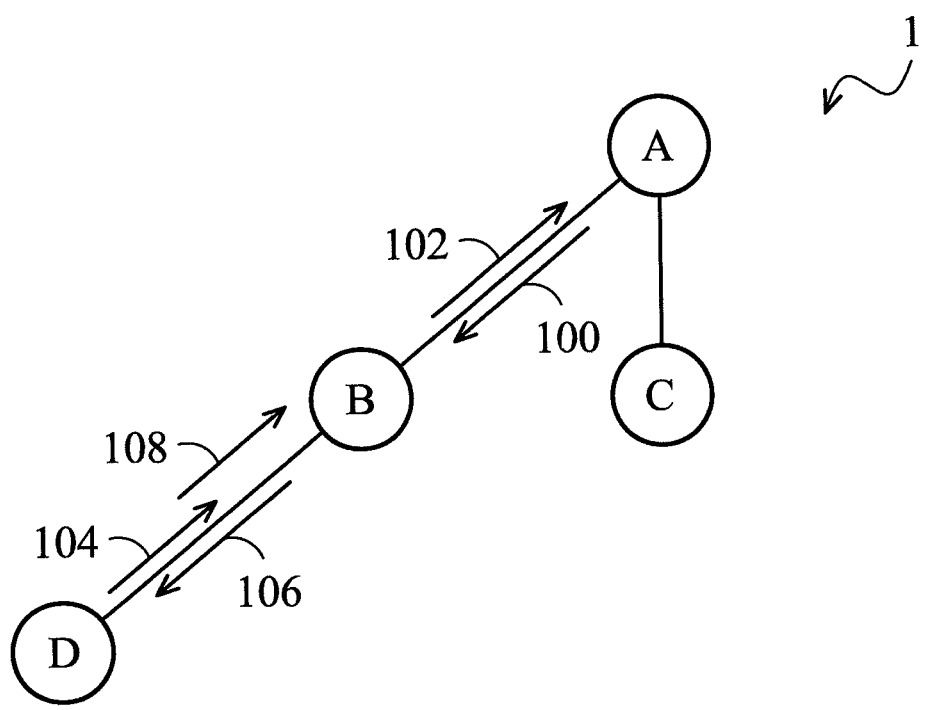
FIG. 1 is a tree diagram of a master-slave tree network 1 according to an embodiment of the disclosure.

The embodiments of the disclosure disclosed herein may be incorporated into all types of master-slave tree network architectures which comprise the Powerline Intelligent Metering Evolution (PRIME) standard. The PRIME standard provides a means for monitoring a network via power distribution lines, and details for the physical layer and the Media Access Control (MAC) layer of a base node at a master station and a service node at a slave station. FIG. 1 is a tree diagram of a master-slave tree network 1 according to an embodiment of the disclosure, comprising nodes A, B, C, and D. The Node A is a base node or a root node of the master-slave tree network 1. The nodes B, C, and D are service nodes. The master-slave tree network 1 may be realized by a wired or wireless network. FIG. 1 depicts a process for establishing the master-slave tree network 1, where the node A periodically distributes a beacon signal to synchronize and maintain all nodes in the master-slave tree network 1. When a new node B or C entering the master-slave tree network 1 receives a beacon signal 100, the new node issues a register packet 102, and the response containing a Node Identifier (NID) constituted by a Switch Identifier (SID) and a Local Node Identifier (LNID). When a new node D would also like to join the master-slave tree network 1 later, the new node D sends a Promotion Need Protocol Data Unit (PNPDU) 104 to neighboring nodes (neighboring device), requesting the neighboring node B to forward the PNPDU message to the root node A. When receiving the PNPDU 104 from the node D, the node B may request the root node to change a node type thereof to become a switch node. Consequently the node D may receive the beacon signal and transmit a register packet 108 via the node B, thereby completing node registration. The tree establishment process is complex, and a breakdown at an intermediate node leads all subtree nodes to become disconnected from the master-slave tree network 1 and requires registration again, into the master-slave tree network 1. The impact of an intermediate node breakdown increases with the size of the master-slave tree network 1.

Accordingly, for conventional master-slave tree network architecture, apart from the transmission efficiency yet to be improved, a more severe issue is that one of the nodes B, C, D suffering from a malfunction, leads to a disruption in local network communication. For example, when the node B has a malfunction, every single node successive to the node B is affected. The affected node D loses the connection to the master-slave tree network 1 and goes back to a disconnected status, wherein all procedures for re-establishing the connection to the master-slave tree network 1 must be completed, and a new node identifier assigned by the node A is received once again before being able to continue with network communication.

Figure 2:
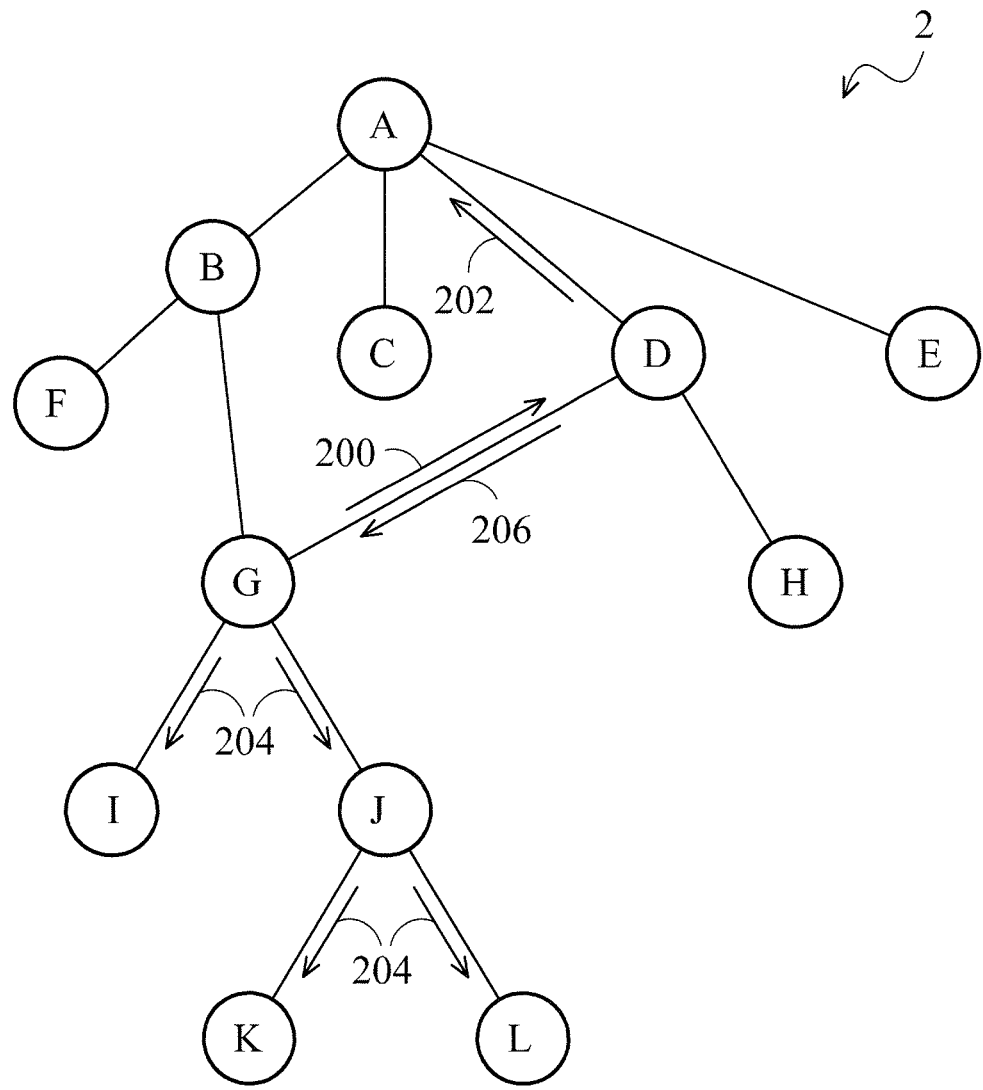
FIG. 2 shows a path recovery method 2 according to an embodiment of the disclosure.

The embodiments in the disclosure provide a mechanism, wherein the master-slave tree network 2 quickly recovers from a broken node. FIG. 2 shows a path recovery method 2 according to an embodiment of the disclosure. The root node A issues beacon signals periodically to maintain network topology. Once the node G (first slave device) fails to receive a beacon signal, it may determine that the preceding node (Node B) has been disconnected from the master-slave tree network 2. In order to re-establish the connection, the node G may select the most efficient neighboring node D from a neighboring node list which serves as an alternate of the broken-down node B to connect to the root node A and package the local node identifier (first identifier) and the switch identifier (second identifier) for the new neighboring node as an NID Change Request (NCR) message (request message). The local node identifier represents the node G, and the switch identifier represents the selected neighboring node D. When receiving the NCR message, the root node A may check the internal topology information, assign a new node identifier for the node G, and package the new node identifier into an NID Change Confirm (NCC) message for transmission back to the node G. Upon receipt of the NCC message, the node G may retrieve a beacon signal via the node D, and restore the communication to the master-slave tree network 2. During the time for requesting for the new node identifier and re-establishing the net connection to the master-slave tree network 2, the node G continues to distribute the beacon signals to all nodes in the sub-networks thereof concurrently, such that all nodes remain unaware of the disconnection of the preceding node B, therefore all internal information of the nodes stay unchanged. As depicted by FIG. 2, when the preceding node B malfunctions, the node G continues to issue the beacon signals to maintain the network topology of nodes I, J, K, and L in the sub-networks thereof, while informing all nodes to stop any data transmission during that time. When node B breaks down, the successive nodes F and G lose the connections to the master-slave tree network 2. Taking the node G as an example, the node G may select a new communication node D from an internal neighboring node list, forming an NID change request packet 200 which is further transmitted to the root node A through the node D. Meanwhile, the node G sends a beacon control package 204 periodically to the successive nodes I, J to maintain the communication over the successive sub-networks. The node J in turn forwards the beacon control package 204 to the successive nodes K and L. When the root node A receives a NID change request message (request message) 202, it may assign a new node identifier to be sent back to the node G, thereby restoring the communication of the node G without modifying any information on the successive nodes I, J, K, and L. The broken node needs to transmit the local node identifier and the switch node identifier by sending the MD change request message 200 to the root node, and in return, acquires the new node identifier by receiving the ND change confirm message 206.

The neighboring node list may be realized by a lookup table, a list, or a file. In some embodiments, the neighboring node list is implemented by a lookup table. For example, a neighbor lookup table (NLT) records information on all neighboring nodes which include a local node identifier, a switch identifier, a neighboring node identifier (neighboring device identifier), and a sub-network Address (SNA), as shown in a Table 1:

TABLE 1

| Neighboring node | Neighboring node 1 | Neighboring node 2 | Neighboring node 3 | — |
|---|---|---|---|---|
| F | B | — | G | — |
| G | B | — | F | — |
| — | — | — | — | — |
| K | F | G | I | — |

The neighbor lookup table is established immediately after the service node enters the master-slave tree network 2. The root node A informs all nodes to update the NLT by a topology change packet whenever a node leaves the master-slave tree network. When a new node joins the master-slave tree network 2, a promotion needed PDU is received by a neighboring node to update the NLT thereof. For example, the node K issues the promotion need PDU packet requesting for a network registration when joining the master-slave tree network 2, and the neighboring node thereof receives the promotion need PDU packet and responds accordingly, thus the node K may establish the NLT according to the received responses. When the node C leaves the master-slave tree network 2, the root node A broadcasts a Topology Change (TC) message to the master-slave tree network 2 to inform the master-slave tree network 2 of the leaving of the node C. In response, the neighboring nodes of the node C may update the NLT thereof. When the node L joins the master-slave tree network 2, it sends out the promotion needed PDU packet, and the neighboring node receiving the promotion needed PDU packet may update the presence of the node L into the NLT thereof.

In the early stage of establishing a tree-topology network, a neighboring node list may be built by the promotion needed PDU. The neighboring node list is amended when a node has been changed in the tree-topology network. When a node leaves the master-slave tree network, the root node may inform all nodes to update the neighboring node list. When a new node enters the master-slave tree network, the neighboring node list may be updated by receiving the promotion needed PDU. When a node breaks down, the broken-down node transmits the node identifier and the switch identifier of the new neighboring node to the root node, and in response, acquires the new node identifier.

The conventional tree-topology network fails to provide a way to resolve the issues of the malfunctioned branch node. Further, the PRIME standard employs a direct connection approach to increase the transmission efficiency, as the path recovery after the node breakdown is beyond the scope of the PRIME standard. However, when the upper levels of branches malfunction, the resultant impact affects the master-slave tree network tremendously. The embodiments of the disclosure provides a means for handling the breakdowns in the master-slave tree network, reduces the loading of the root node in the conventional master-slave tree network, decreases bandwidth congestion, thereby achieving power saving. By using the NID change request mechanism the root node can be informed of the information on the change of the switch node. After the root node permits for the change, a NID change confirm message will be sent a node identifier to the requested node, thereby the requested node may recover the communication to the master-slave tree network All nodes in the sub-network of the broken down node needs not update the node path information.

Figure 3:
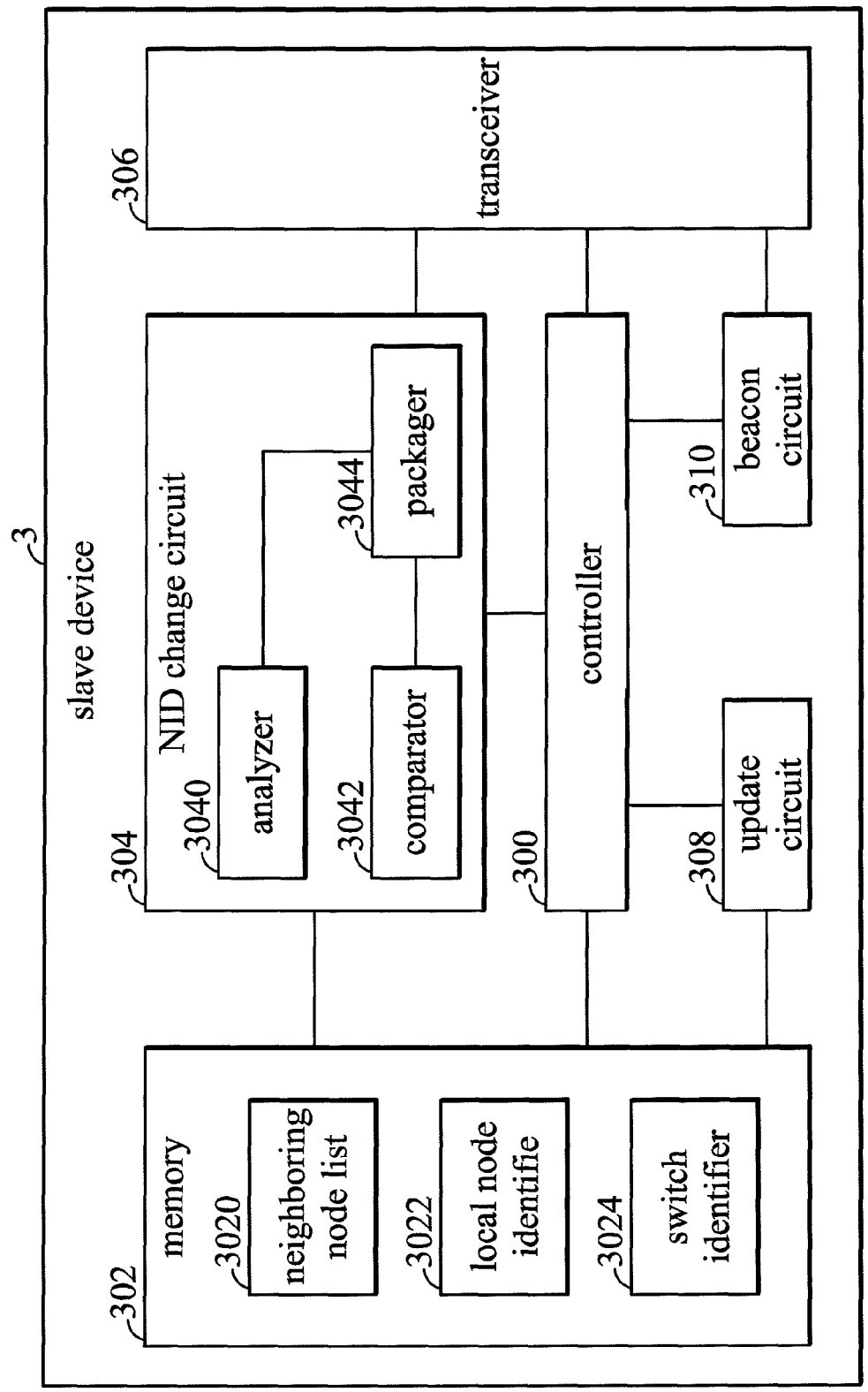
FIG. 3 is a block diagram of a slave device 3 according to an embodiment of the disclosure.

FIG. 3 is a block diagram of a slave device 3 according to an embodiment of the disclosure, connected to the master-slave tree network 2 in the FIG. 2. The slave device 3 comprises a controller 300, a memory circuit 302, a NID change circuit 304, a tranceiver 306, an update circuit 308, and a beacon circuit 310. The controller 300 is coupled to the memory circuit 302, the NID change circuit 304, the transceiver 306, the update circuit 308 and the beacon circuit 310.

The transceiver 306 communicates with other service nodes through three types of packet formats, namely, the beacon PDU, the promotion needed PDU, and generic PDU. The beacon PDU is used to maintain and synchronize the tree-network topology, the promotion needed PDU is used to request for joining of a network and manage a node list, the generic PDU carries control packets for the registration, topology change, NID change request, and NID change confirm messages. In some embodiments, the transceiver 306 is coupled to the NID change circuit 304, the update circuit 308, and the beacon circuit 310.

The memory circuit 302 retains a neighboring node list 3020 (predetermined list), a local node identifier 3022, and a switch node identifier 3024. The memory circuit 302 is accessible by the controller 300, the NID change circuit 304, and the update circuit 308. The neighboring node list 3020 may be realized by means of a lookup table, a list, or a file, and comprises a local node identifier, a switch identifier, a neighboring identifier, and a sub-network address. The memory circuit 302 may be, for example, the neighbor lookup table as shown in the table 1.

The update circuit 308 is configured to update the new neighboring nodes list 3020 according to the promotion needed PDU and the generic PDU that contains the topology change packet.

The controller 300 is configured to determine whether a beacon signal has been received within a predetermined time period. The controller 300 can determine whether the slave device 3 is still in communication with the master-slave tree network when the beacon signal is received within the predetermined time period. Failure to receive the beacon signal within the predetermined time period suggests that a connection node has broken down. Thus, the controller 300 may control the NID change circuit 304 to select a neighboring node to re-establish the connection, and instruct the beacon circuit 310 to continue issuing the beacon signals to all nodes in the sub-network.

The beacon circuit 310 is configured to continue issuing the beacon signals to the successive sub-networks periodically. The issued beacon signal contains information of the beacon signal prior to the disconnection (previous beacon content) and message for temporary data transmission suspension.

The NID change circuit 304 (identifier change request circuit) comprises an analyzer 3040, a comparator 3042, and a packager 3044. The analyzer 3040 and the comparator 3042 are coupled to the packager 3044. The analyzer 3040 is configured to analyze the local node identifier and the neighboring node list, then the comparator 3042 is configured to compare and select an efficient node from the neighboring node list. The local node identifier and the selected neighboring node identifier are respectively transmitted to the packager 3044 for packaging in the NID change request message which is to be transmitted in a generic PDU by the transceiver 306 to the root node. The root node may assign and package a new node identifier (the third identifier) into the NID change confirm message which is reported back to the slave device via the transceiver 306. The assigned new node identifier by the root node may be the same or different from the local node identifier before the network disconnection. The root node manages and assigns node identifiers for all service nodes in the master-slave tree network.

Figure 4:
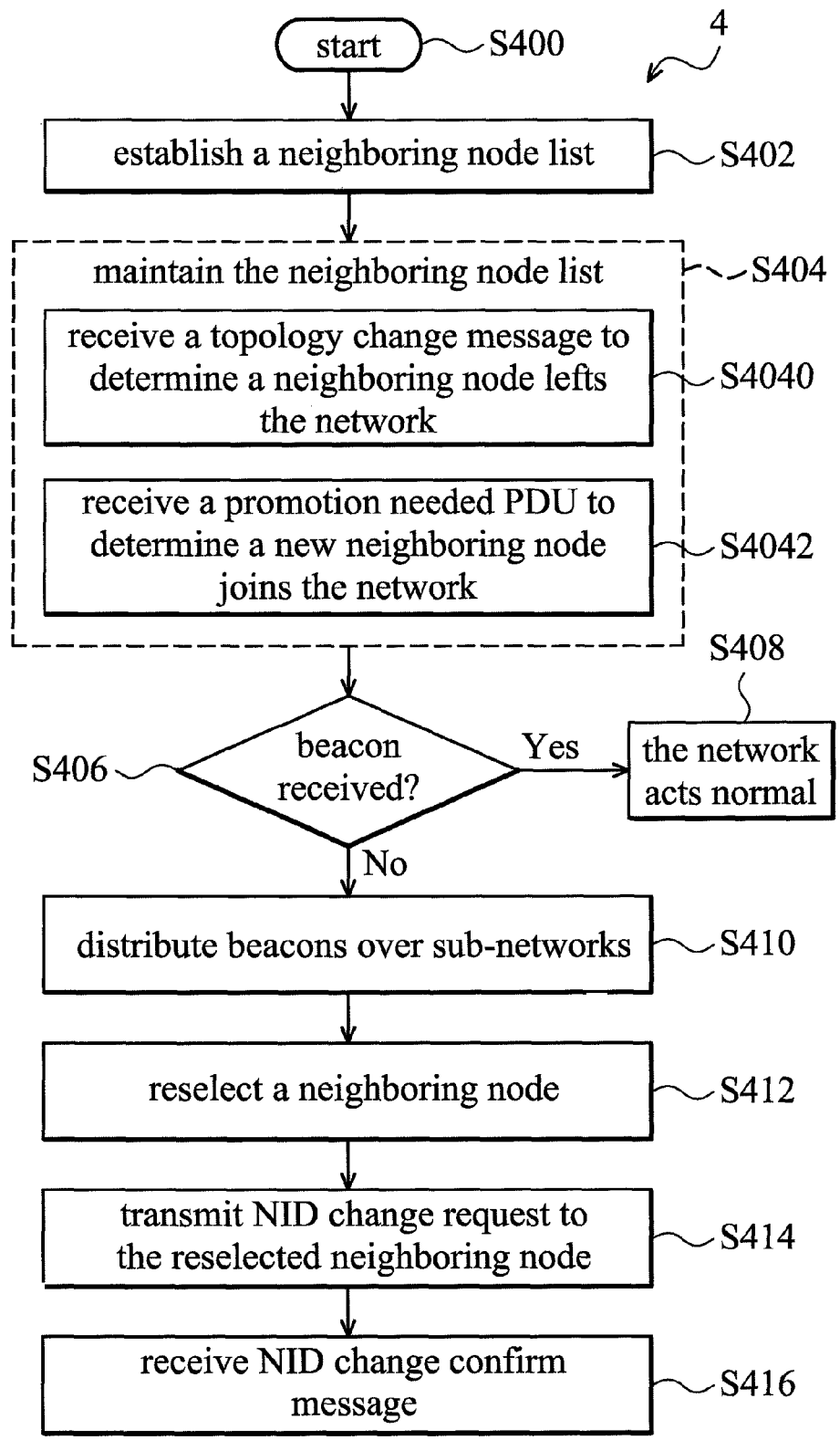
FIG. 4 is a flowchart of a master-slave tree network operation method 4.

FIG. 4 is a flowchart of a master-slave tree network operation method 4, incorporating the slave device 3 in FIG. 3. The master-slave tree network operation method 4 mainly includes a first part on neighboring node list maintenance and a second part on the network recovery. Upon the start of the master-slave tree network operation method 4, the slave device 3 initializes all relevant parameters and circuits to perform the operation network 4 (S400), and establishes and maintains the neighboring node list therein. The slave device 3 begins with broadcasting the promotion needed PDU packet to all neighboring nodes, and establishes the neighboring node list 3020 based on identifiers of all neighboring nodes responding to the broadcasted promotion needed PDU packet (S402). If a node (third slave device) leaves the master-slave tree network 2, the root node may inform the leaving to all service nodes by issuing the topology change message (network change message). If the left node is a neighboring node to the slave device 3, the slave device 3 may update the neighboring node list 3020 by removing the left node from the neighboring node list 3020 (S4040). When a new node (third slave device) joins the master-slave tree network 2, the new joining node may inform all neighboring nodes by sending the promotion needed PDU (network change message). Thus, after receiving the promotion needed PDU, the slave device 3 may update the neighboring node list 3020 according to the received promotion needed PDU by adding the joining node into the neighboring node list 3020. (S4042). The second part on the network recovery may be triggered by failing to receive any beacon signal in the predetermined time period. The slave device 3 determines whether a beacon signal is received in the predetermined time period (S406), and determines the slave device 3 has been disconnected from the master-slave tree network 2 if not, and the slave device 3 is still in connection with the master-slave tree network if so (S408). When the slave device 3 is disconnected, the slave device 3 may continue sending the previous beacon signal to retain the connections in the sub-networks (S410), re-select an operational and efficient neighboring node to serve as a substitute of the broken-down node (S412), and package the local node identifier and the switch identifier of the new neighboring node into the NID change request message for delivery to the root node (S414). After receiving the NID change request message, the root node may re-assign a new node identifier and respond the request message with the NID change confirm message to the slave device 3. The slave device 3 may retrieve the beacon signal from the new neighboring node after receiving the NID change confirm message that includes the new local node identifier (S416).

Figure 5:
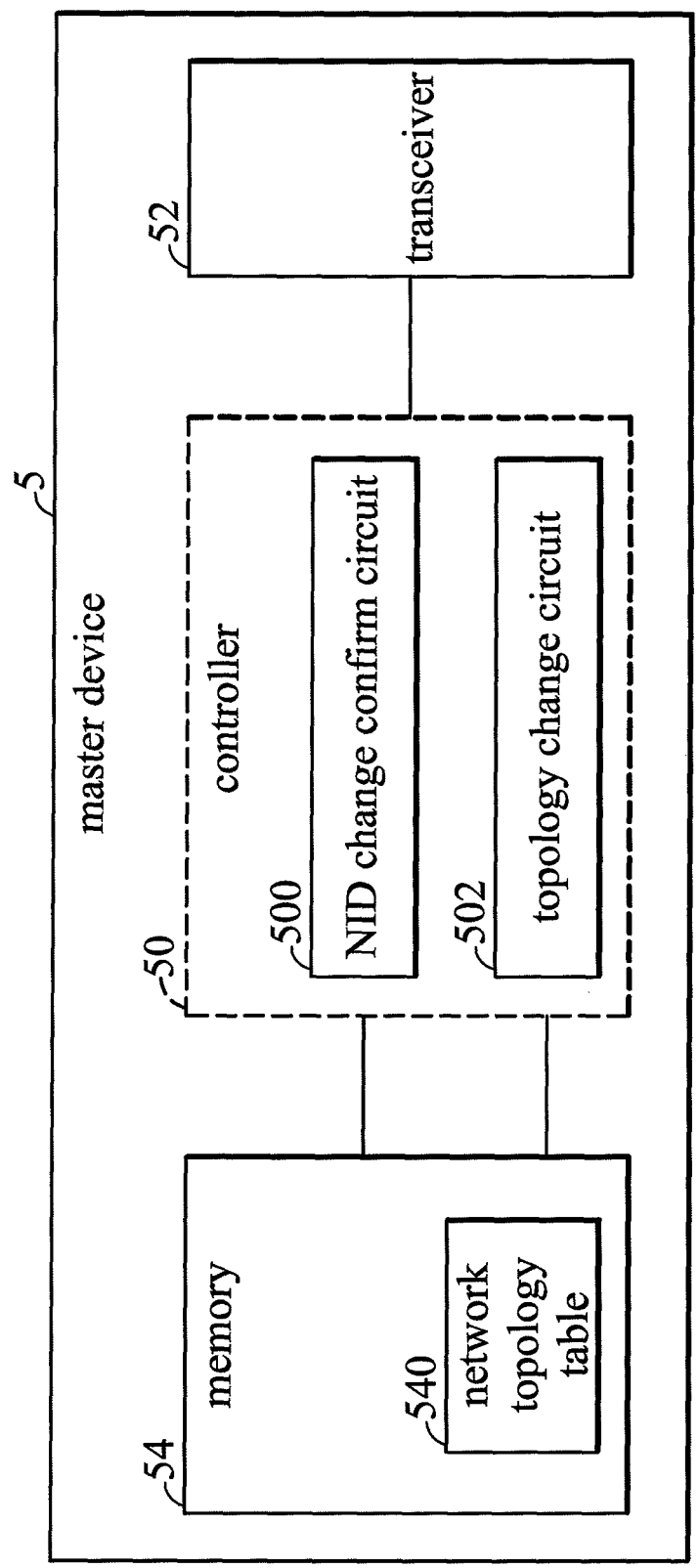
FIG. 5 is a block diagram of a master device 5 according to an embodiment of the disclosure.

FIG. 5 is a block diagram of a master device 5 according to an embodiment of the disclosure, incorporating the master-slave tree network 2 in FIG. 2. The master device 5 comprises a controller 50, transceiver 52, and memory circuit 54. The controller 50 controls operations of the transceiver 52 and the memory circuit 54.

The controller 50 comprises an NID change confirm circuit 500 and a topology change circuit 502. The NID change confirm circuit 500 is configured to assign a node identifier for the disconnected node that sends the NID change request message. The topology change circuit 502 is configured to broadcast the topology change message after detecting that a node has left the master-slave tree network 2 or was shut down, thereby informing all nodes in the master-slave tree network to remove the left node or the shut down node.

The memory circuit 54 includes topology information 540 containing usable and already used network identifier, network address and other network resources in the master-slave tree network 2. The topology information 540 includes the local node identifiers and the corresponding switch identifier for all nodes in the master-slave tree network 2.

When a new node attempts to join the master-slave tree network 2, it may transmit the registration packet to the master device 5. After the transceiver 52 receives the registration packet, the controller 50 may check the topology information 540 and assign a node identifier for the new node that requests for the registration. When a disconnected node attempts to reconnect to the master-slave tree network 2, it may transmit the NID change request message to the master device 5. After the transceiver 52 receives the NID change request message, the controller 50 may check the topology information 540, assign a node identifier for the disconnected node, and update the new node identifier for the disconnected node. When a node leaves the master-slave tree network 2 or is shut down, the controller 50 may remove the node identifier associated with the left or shutdown node from the topology information 540, and broadcast the topology change message to inform all nodes in the master-slave tree network 2 that the node is no longer in the master-slave tree network 2.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

Thus methods and devices of the disclosure for managing the network communication are efficient and fast path recovery during a branch node breakdown. While the disclosure has been described by way of example and in terms of the embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method, performed by a first slave device connected to a master-slave tree network, comprising:
   determining whether a beacon has not been received within a predetermined time period; and
   distributing a first beacon to at least one second slave device, which is a node in a sub-network of the first slave device, periodically when no beacon has been received within the predetermined time period and the first slave device is disconnected from the master-slave tree network,
   wherein for the first slave device to remain in the master-slave tree network, the beacon is received by the first slave device within the predetermined time period, wherein the master-slave tree network is a wired network, and
   wherein the first beacon comprises previous beacon content received before the first slave device loses its connection to the master-slave tree network and information indicative of data transmission is suspended so that a network topology in the sub-network is maintained and the second slave device is informed to stop any data transmission.

2. The method of claim 1, further comprising:
   selecting a neighboring device from a predetermined list; and
   sending a request message comprising a first identifier and a second identifier to the selected neighboring device;
   wherein the first identifier represents the first slave device; and
   the second identifier is from the selected neighboring device.

3. The method of claim 2, further comprising:
   in response to the sent request message, receiving a confirm message comprising a third identifier from the selected neighboring device;
   wherein the third identifier is assigned to the first slave device.

4. The method of claim 1, further comprising:
   maintaining a predetermined list comprising a neighboring device identifier after a neighboring device is selected for establishing a connection thereto; and
   updating the predetermined list after receiving a network change message,
   wherein the network change message indicates that a third slave device in the master-slave tree network has been changed, and
   the neighboring device identifier is indicative of the neighboring device connected to the master-slave tree network.

5. The method of claim 4, wherein:
   the network change message indicates that the third slave device is to be connected to the master-slave tree network; and
   the updating step comprises adding the third slave device into the predetermined list.

6. The method of claim 4, wherein:
   the network change message indicates that the third slave device has been disconnected from the master-slave tree network; and
   the updating step comprises removing the third slave device from the predetermined list.

7. A master device, for use in a master-slave tree network, comprising:
   a transceiver, configured to receive an identifier request message comprising a first identifier, wherein the first identifier identifies a first slave device, which is abnormally disconnected from the master-slave tree network; and
   a controller, coupled to the transceiver, configured to assign a second identifier to the first slave device in response to the identifier request message;
   wherein the transceiver is further configured to transmit an identifier confirm message comprising the second identifier to the first slave device, and the first slave device distributes a first beacon to at least one second slave device, which is a node in a sub-network of the first slave device, when being abnormally disconnected from the master-slave tree network, wherein the master-slave tree network is a wired network, and
   wherein the first beacon comprises previous beacon content received before the first slave device loses its connection to the master-slave tree network and information indicative of data transmission is suspended so that a network topology in the sub-network is maintained and the second slave device is informed to stop any data transmission.

8. The master device of claim 7, wherein:
the transceiver is further configured to broadcast a topology change message in the master-salve tree network; and
the topology change message indicates that a connection between a third slave device and the master device has been broken.

9. A slave device, connected to a master-slave tree network, comprising:
a controller, configured to determine whether a beacon has not been received within a predetermined time period; and
a beacon circuit, coupled to the controller, configured to distribute a first beacon to at least one second slave device, which is a node in a sub-network of the first slave device, periodically when no beacon has been received within the predetermined time period and the first slave device is disconnected from the master-slave tree network,
wherein for the first slave device to remain in the master-slave tree network, the beacon is received by the first slave device within the predetermined time period, wherein the master-slave tree network is a wired network, and
wherein the first beacon comprises previous beacon content received before the first slave device loses its connection to the master-slave tree network and information indicative of data transmission is suspended so that a network topology in the sub-network is maintained and the second slave device is informed to stop any data transmission.

10. The slave device of claim 9, further comprising:
an identifier change request circuit, coupled to the controller, configured to select a neighboring device from a predetermined list; and
a transceiver, coupled to the identifier change request circuit, configured to send a request message comprising a first identifier and a second identifier to the selected neighboring device;
wherein the first identifier represents the first slave device; and
the second identifier represents the selected neighboring device.

11. The slave device of claim 10, wherein:
in response to the sent request message, the transceiver is configured to receive a confirm message comprising a third identifier from the selected neighboring device; and
the third identifier represents the first slave device.

12. The slave device of claim 9, further comprising:
a memory, coupled to the controller, configured to maintain a predetermined list comprising a neighboring device identifier after a neighboring device is selected for establishing a connection thereto,
wherein the controller is further configured to update the predetermined list after receiving a network change message,
the network change message indicates that a third slave device in the master-slave tree network has been changed, and
the neighboring device identifier is indicative of the neighboring device connected to the master-slave tree network.

13. The slave device of claim 12, wherein:
the network change message indicates that the third slave device is to be connected to the master-slave tree network; and
the controller is configured to add the third slave device to the predetermined list.

14. The slave device of claim 12, wherein:
the network change message indicates that the third slave device has been disconnected from the master-slave tree network; and
the controller is configured to remove the third slave device into the predetermined list.

* * * * *